Dec. 21, 1926.

J. DEGERTH ET AL

CLARIFIER

Filed May 11, 1926

Inventor
John Degerth
Frantz Mortensen

Munn &Co
Attorneys

Patented Dec. 21, 1926.

1,611,725

UNITED STATES PATENT OFFICE.

JOHN DEGERTH AND FRANTZ MORTENSEN, OF HELSINGFORS, FINLAND, ASSIGNORS TO MASKIN-OCH BROBYGGNADS AKTIEBOLAGET IN HELSINGFORS.

CLARIFIER.

Application filed May 11, 1926, Serial No. 108,363, and in Germany May 7, 1925.

The use of centrifugal clarifiers for cleaning various fluids, especially oil, benzine and coloring is already known. In connection with fluids easily cleaned centrifugal clarifiers without any insertion in the bowl may be used, but in connection with fluids more difficult to clean, bowls with so called disc insertions are very often used. When using such insertions, however, the space available for dirt accumulation is considerably reduced which means that the clarifier has to be cleaned frequently and on account of the number of discs such cleaning is difficult.

The present invention refers to a clarifier having a great efficiency, a large space for dirt accumulation and which at the same time is comparatively easy to clean.

Figure 1:
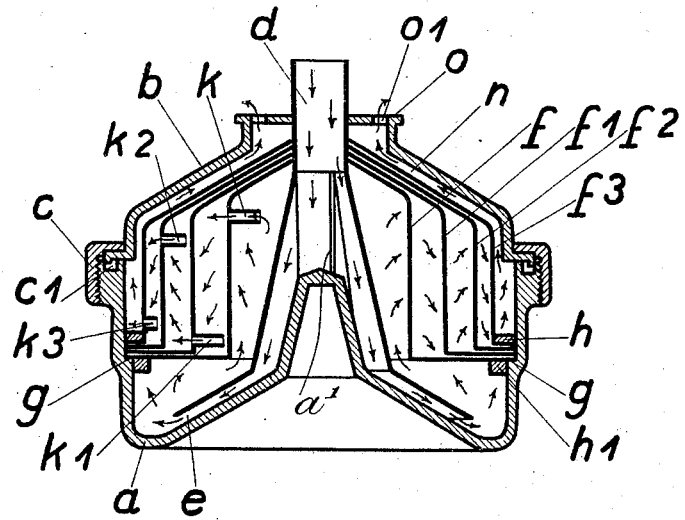
Figures 2, 3:
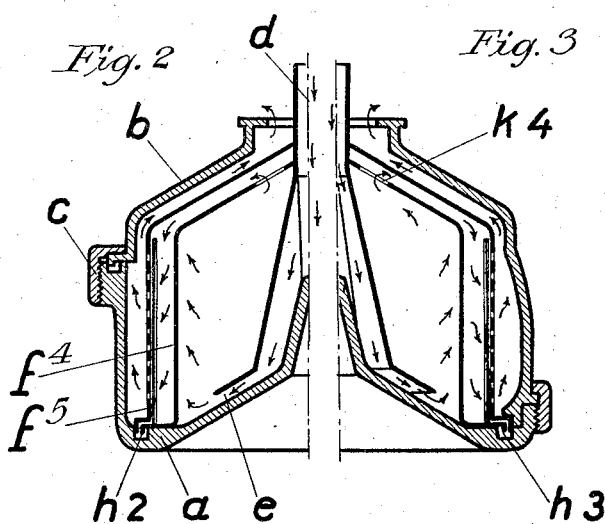

In the accompanying drawing which illustrates our present invention and forms a part of this specification:

Figure 1 is a central vertical sectional view through one form of our invention, Figure 2 is a similar view through one-half of a slightly modified form and, Figure 3 is a similar view through one-half of still another slightly modified form.

Referring now to these figures, and particularly to Fig. 1, our invention is shown as including a bowl $a$ provided with a cover $b$, the cover having a flanged lower edge securely held in connection with the upper edge of the bowl $a$ by virtue of a clamping ring $c$, which is threaded on the bowl, the joint thus formed preferably including a rubber or other gasket ring $c'$.

Depending centrally within the bowl through the cover $b$ is a fluid supply tube $d$ provided with a lower flared portion within the bowl, a section of which forms an outlet channel $e$ for the entering fluid adjacent to the base of the bowl. The base of the bowl may have upstanding wings $a'$ within the lower portion of the supply tube $d$ in order to cause rotation of the fluid as the bowl is rotated.

Within the bowl one or more clarifying disks or shells of cylindrical form, as seen at $f$, $f'$, $f^2$ and $f^3$, are disposed in the spaced concentric relation indicated around the fluid supply tube $d$, the shells being spaced from one another and the inner shell being spaced from the tube $d$ to form an enlarged collecting chamber within the central portion of the bowl having as its only outlet an opening through the upper portion of the inner shell $f$.

The lower portions of the several shells have outstanding flanges $g$ in contacting relation, these flanged portions $g$ being engaged immediately adjacent to the inner surface of the bowl by means of clamping rings $h$ and $h'$, which serve to prevent leakage between the spaces enclosed by the shells.

The several shells $f$, $f'$, $f^2$ and $f^3$ respectively have outlet openings $k$, $k'$, $k^2$ and $k^3$, it being noted that these openings communicate with inwardly projecting tubes so that the outlet of the inner shell $f$ especially is located adjacent to the supply tube $d$, and being in the upper portion of the inner shell $f$ as previously described, there is thus formed an enlarged collecting chamber around the tube within the inner shell for the accumulation of dirt and foreign matter.

The cover $d$ has at its upper edge $o$ outlet openings $o'$ which communicate with the space $n$ around the outer shell $f^3$ so as to thus provide for the final outlet of the cleaned fluid.

The vertical walls of the discs or shells inside the bowl may be shaped in various ways either straight with overflow pipes ($k^1$, $K^2$, $K^3$), or waved, or stallated, or of other shape, the idea being that each chamber has a big dirt holding capacity and is fitted with openings as near the center as possible in order to allow the dirt to accumulate without interfering with the passage of the fluid.

In Figure 2 the insertions are shown as straight division plates with flanges at the bottom. This figure shows the flanges sealed by one tightening ring $h^2$ at the base of the bowl to seal the shells $f^4$ and $f^5$, and also shows the bowl and its cover connected as in Fig. 1. In Fig. 3 the cover is differently shaped and in this case the tightening ring $h^3$ serves at the same time for making a joint for the flanges of the shells as well as between the bowl and its cover.

In Figures 2 and 3 the walls of the outer insertion or shell are shown perforated and may if required serve as a filter in connection with filtering paper or other filtering material indicated at $s$.

A clarifier bowl as described above works as follows:—

The fluid enters the center pipe $d$ and passes the opening $e$ into the bowl. By means of the centrifugal force created by the quickly revolving bowl the heaviest dirt will remain at the bottom of the bowl and the somewhat clarified fluid will be forced through tube $k$ and thereafter through the tubes $k^1$, $k^2$, $k^3$, into the space between the outer insertion and the bowl and will leave the bowl at the edge $o$. Dirt will be deposited between the insertions and gradually fill the spaces but will not interfere with the passage of the fluid, until the bowl is entirely filled.

In Figures 2 and 3 the action of the bowl is the same as in Figure 1, the only difference being that instead of outletting through tubes carried by the shells the fluid will pass through the opening $k^4$ and will leave the bowl in the same way as described above since such opening is located in the upper portion of the inner shell adjacent to the supply tube.

The number of insertions may be varied in accordance with the nature of the fluid to be clarified.

Claims:

1. A centrifugal clarifier including a bowl, a fluid inlet tube depending centrally into the bowl and discharging from its lower end adjacent to the base of the bowl, and discs or shells within the bowl in concentric relation around the said tube, the inner disc having a lower enlarged portion forming an enlarged unobstructed collecting chamber around the said tube and said inner shell having an opening in its upper portion adjacent to the tube, constituting the sole outlet from said collecting chamber.

2. A centrifugal clarifier including a bowl, a fluid inlet tube depending centrally into the bowl, shells around the tube and spaced therefrom and from one another in concentric relation, a cover clamped to the bowl and having a fluid outlet in communication with the space around the said shells, the lower portions of the shells having flanges adjacent to one another, and means engaging the flanges within the bowl to connect the flanges and prevent leakage between the same.

3. A centrifugal clarifier including a bowl, a fluid inlet tube depending centrally into the bowl and opening adjacent to the base thereof, concentric shells within the bowl spaced from the latter and from one another and also spaced from the said tube, the inner shell having a lower enlarged portion and an upper outlet and forming therein an enlarged collecting chamber around the tube with the upper portion of which the said outlet communicates at a point adjacent to the tube, said shells having lower flanged portions in engagement with one another, and means engaging the said flanges to prevent leakage through the flanges.

4. A centrifugal clarifier including a bowl having a fluid inlet opening downwardly therein at its center, a series of shells spaced apart in concentric relation within the bowl and having lower flanged portions, and means to engage and seal the said flanges to one another and to the bowl.

JOHN DEGERTH.
FRANTZ MORTENSEN.